US012133311B1

(12) United States Patent
Liu

(10) Patent No.: US 12,133,311 B1
(45) Date of Patent: Oct. 29, 2024

(54) CHRISTMAS TREE LIGHTING DECORATION CONTROL SYSTEM

(71) Applicant: Silver Beauty Electronic and Lighting Co., Ltd., HeShan (CN)

(72) Inventor: Huawang Liu, HeShan (CN)

( * ) Notice: Subject to any disclaimer, the term of this patent is extended or adjusted under 35 U.S.C. 154(b) by 0 days.

(21) Appl. No.: 18/769,369

(22) Filed: Jul. 10, 2024

(30) Foreign Application Priority Data

May 15, 2024 (CN) ......................... 202410606614.8

(51) Int. Cl.

*H05B 47/10* (2020.01)
*H05B 45/345* (2020.01)
*H05B 47/155* (2020.01)
*H05B 47/16* (2020.01)
*H05B 45/20* (2020.01)

(52) U.S. Cl.

CPC ......... *H05B 47/155* (2020.01); *H05B 45/345* (2020.01); *H05B 47/16* (2020.01); *H05B 45/20* (2020.01)

(58) Field of Classification Search

CPC ........ H05B 45/14; H05B 45/20; H05B 45/24; H05B 45/30; H05B 45/345; H05B 47/10; H05B 47/155; H05B 47/16; H05B 45/10

See application file for complete search history.

(56) References Cited

U.S. PATENT DOCUMENTS

2008/0203936 A1 * 8/2008 Mariyama .............. H05B 45/22 315/246

FOREIGN PATENT DOCUMENTS

CN 201119055 Y * 9/2008

* cited by examiner

*Primary Examiner* — Jimmy T Vu
(74) *Attorney, Agent, or Firm* — Novoclaims Patent Services LLC; Mei Lin Wong

(57) ABSTRACT

A Christmas tree lighting decoration control system includes a power supply device, a control device and a LED light string for controlling on/off, flashing, color change and time setting of the LED light string. The power supply device includes a power circuit in a first housing, a first rectifier filter circuit, a power chip, a feedback circuit, a transformer and a second rectifier filter circuit. The control device includes a second housing with an operation key or a radio frequency remote control operation key, a plug-in input terminal, a second output terminal and a control circuit, which includes a power supply circuit, a detection and protection circuit, a main control chip IC1, a signal processing chip IC2 and a radio frequency receiving circuit, and function control circuit. The LED light string includes multiple groups of poleless dual-color or discrete poleless LED light strings connecting to a LED double-flash light bead.

19 Claims, 6 Drawing Sheets

CHRISTMAS TREE LIGHTING DECORATION CONTROL SYSTEM

CROSS REFERENCE OF RELATED APPLICATION

This is a non-provisional application that claims priority to Chinese application number 202410606614.8, filing date May 15, 2024, the entire contents of each of which are expressly incorporated herein by reference.

BACKGROUND OF THE PRESENT INVENTION

Field of Invention

The present invention relates to Christmas tree lighting decoration parts, and more particularly to a Christmas tree lighting decoration control system that can realize output shutdown function without turning off the power supply, has low energy consumption and is safe to use.

Description of Related Arts

Christmas is one of the most important worldwide holidays. During Christmas, people place Christmas trees in front of their doors and in public places, and decorate them with lights and other ornaments to highlight the festive atmosphere. As an important decorative item to set off the festive atmosphere, lighting is not only widely used to celebrate Christmas, but is also used for lighting decoration occasions such as New Year and Spring Festival. Existing Christmas decorative lights mostly use a light string structure formed by connecting multiple light beads. In actual use, one or some of the light beads may malfunction and cause a short circuit, thus affecting the normal operation of the decorative lights. For this reason, someone has set up a power supply short-circuit protection function in the circuit. However, because the power supply is generally 1.1 to 1.2 times larger than the load, it takes a certain amount of time to meet the parameters required for power supply protection. During this period, components such as components or casings may be burned out, resulting in usage accidents.

SUMMARY OF THE PRESENT INVENTION

An objective of the present invention is to solve the above problem and provide a Christmas tree lighting decoration control system with a real-time short-circuit detection function, that can immediately shut down the power when a short-circuit abnormality occurs at the load output end, effectively protect the operational safety of the system and realize multi-functional control of the light string, and has a low energy consumption.

In one aspect of the present invention, it provides a lighting decoration control system for Christmas tree, comprising a power supply device, a control device and a LED light string, wherein the power supply device comprises: a first housing and a power circuit received inside the first housing, the power circuit having a power input terminal and a power output terminal comprises a first rectifier filter circuit connected to the power input terminal, a power chip U1 connected to the first rectifier filter circuit, a feedback circuit connected to the power chip U1, a transformer T1 comprising a primary coil connected to the power chip U1 and a secondary coil, and a second rectifier filter circuit connected to the secondary coil of the transformer T1 and the power output terminal, wherein the first housing comprises a power plug connecting to the power input terminal and a first output connected to the power output terminal;

the control device comprises a second housing and a control circuit received inside the second housing, wherein the second housing comprises a control key or a radio frequency remote control key provided thereon, a plug-in input terminal and a plug-in second output terminal; the control circuit comprises a power supply circuit, a detection and protection circuit connected to the power supply circuit as well as the control key or the radio frequency remote control key respectively, a main control chip IC1, a signal processing chip IC2, a radio frequency receiving circuit and a function control circuit connected to the detection and protection circuit respectively, the main control chip IC1 is configured to process functional control on the LED light string through the function control circuit, and the signal processing chip IC2 is configured to process data sent by the remote-control device received by the radio frequency receiving circuit, the LED light string is composed of a plurality groups of poleless dual-color LED light strings connected together, or a plurality groups of discrete poleless LED light strings connected together, in each the group of poleless dual-color LED light strings or in each group of discrete poleless LED light strings, at least one LED double-flash light bead is provided and connected thereto, the LED light string is electrically connected to the second output terminal of the control device through a connecting wire, and the control device controls an on/off switching, a light flashing, a color change, and a time setting of the LED light string, the plurality groups of poleless dual-color LED light strings or the plurality groups of discrete poleless LED light strings are arranged to install on different branches of the Christmas tree respectively.

The first rectifier filter circuit of the power circuit comprises a bridge stack BD1, capacitors EC1 and EC2, inductors L1 and L2 and resistors R1 and R2, the capacitors EC1 and EC2, the inductors L1 and L2 and the resistors R1 and R2 are connected to an output terminal of the bridge stack BD1, the bridge stack BD1 and the capacitor EC1 rectifies and filters an AC power to obtain a smooth DC power, then the DC power is stepped down and filtered through the resistors R1, R2 and the capacitor EC3, and is transmitted through the resistors R6 and R7 to connect to the power chip U1 to provide power supply to the power chip U1; the feedback circuit comprises resistors R5, R13, capacitors C1, EC3, resistors R3, R4 and a diode D2, the resistors R5, R13, the capacitors C1 and EC3 are connected in parallel with the power chip U1, the resistors R3, R4 and the diode D2 are connected to the transformer T1, the feedback circuit feeds back an output signal of the transformer T1 to the power chip U1; the transformer T1 comprises a primary coil and a secondary coil, the primary coil of the transformer T1 is connected to the power chip U1 through the resistor R9, the capacitor C2 and the resistors R1 and R2 while the resistor R9, the capacitor C2 and the resistors R1 and R2 are connected in parallel with the resistor R8 and the diode D1, the secondary coil of the transformer T1 is connected to the second rectifier filter circuit, which is constructed by diodes D3, D4, a capacitor C3, a resistor R10 and a capacitor EC4, the second rectifier filter circuit is connected to an output end of the power circuit through the resistor R11, and is connected to the primary coil of the transformer T1 through the capacitor CY1, the power chip U1 enables the power circuit to control the transformer T1 to store energy when the power circuit is under an on status, and to discharge energy when the power circuit is under an off status The first housing has a rectangular housing structure defining a length direction, the power plug and the first output terminal are positioned at two opposite ends of the first housing along the length direction; the second housing has a rectangular housing structure or an oblate housing structure, the control key or the hand-operated press key and a FR (radio frequency) remote control operated key, or is a foot-operated press key and a radio frequency remote control operated key.

The power supply circuit of the control circuit comprises a power chip U2, a diode D1, resistors R1, R2, capacitors C1, C2 and a Zener diode Z1, the diode D1, the resistor R1 and the capacitor C1 are connected to an input terminal of the power chip U2, the capacitor C2, the resistor R2 and the Zener diode Z1 are connected to an output terminal of the power chip U2, and the Zener diode Z1 is connected to the radio frequency processing chip IC2, the power supply circuit reduces the 29V DC power provided by the power circuit to 3.3V DC power for use by the radio frequency processing chip IC2.

The detection and protection circuit comprises triodes Q1, Q4, Q7, resistors R3, R4, R6, R7, R11, R13 and a diode D1, the resistors R3, R4, R6, R7 and diode D1 are connected to the triode Q1, the resistors R11 and R13 are connected in parallel and between the triode Q4 and Q7, the triode Q7 is connected to the main control chip IC1 through the resistor R8, the detection and protection circuit performs overload and short-circuit protection so that when the load is short-circuited, the triode Q1 is turned on, and the triodes Q4 and Q7 are cut off to protect each circuit, including the power supply circuit, the function control circuit, and the main control chip IC1.

The main control chip IC1 is connected to the triodes Q7, Q3, Q6, the signal processing chip IC2, the control key and the radio frequency remote control key respectively.

The radio frequency receiving circuit comprises a signal processing chip IC2, a resistor R15, a crystal oscillator Y1, an inductor L1, and capacitors C5, C6, and C7, the resistor R15 is connected between the signal processing chip IC2 and the main control chip IC1, the crystal oscillator Y1 has one end connected to the signal processing chip IC2 and another end connected to the ground, the radio frequency receiving circuit receives data sent by the remote-control device through the signal processing chip IC2, the main control chip IC1 processes the data received by the signal processing chip IC2 and then controls the function of the LED light string.

The function control circuit comprises triodes Q2, Q3, Q5, and Q6, the triode Q3 is connected to the main control chip IC1 through the resistor R5, the triode Q6 is connected to the triode Q5 and the main control chip IC1 respectively, the main control chip IC1 process function control of on/off switching, light flashing, color change and time of the LED light string through the function control circuit.

The plurality group of poleless dual-color LED light strings of the LED light string are formed by connecting a plurality of poleless dual-color LED light beads in parallel to form one group of light strings, and then connecting a plurality groups of light strings in series, wherein an output end of the poleless dual-color LED light strings is electrically connected to the second output terminal of the control device through a resistor or a constant current diode, the LED double-flash light bead is connected in parallel between two the poleless dual-color LED lamp beads or at one end of each the group of poleless dual-color LED lamp strings, each the LED double-flash light bead is built-in with two flicker control chips The plurality group of discrete poleless LED light strings of the LED light string are formed by connecting a plurality of discrete poleless LED light beads in series to form one group of light string, and then connecting a plurality groups of light strings in parallel, wherein an output end of the discrete poleless LED light string is electrically connected to the second output terminal of the control device through a resistor or a constant current diode, the LED double-flash light bead is connected in series between two the discrete poleless LED light beads or at one end of each the group of discrete poleless LED light strings, each the LED double-flash light bead is built-in with two flicker control chips.

The advantageous effect of the present invention is that it effectively solves the existing problems in the prior art. According to the present invention, since the power supply input end is provided with a power chip as well as a two-pole rectifier filter circuit, a transformer and a feedback circuit, which are connected to the power chip, the system can obtain stable input voltage and current, and can effectively prevent voltage and current overload. The control device is equipped with a detection and protection circuit that can detect the operating status of the system in real time and protect the system from overload and short circuit. The functional control circuit of the control device can perform multi-functional control such as on/off switching, flashing, color change and time setting on the LED light string. The control device can also choose between manual and remote-control modes, which improves the convenience of operation. The short-circuit real-time detection function of the present invention can immediately shut down the power supply when a short-circuit abnormality occurs at the load output end, which can effectively protect the operation safety of the system. The present invention also has the characteristics of easy installation and use and low energy consumption.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
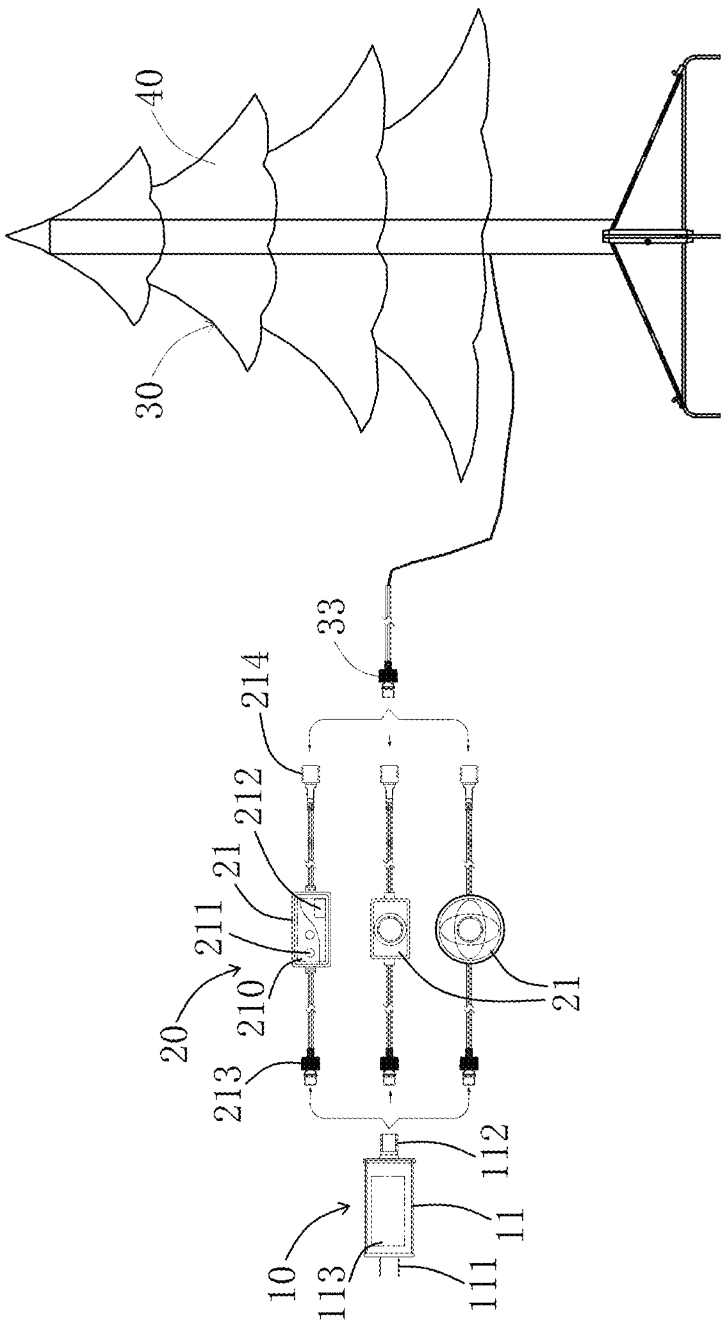
FIG. 1 is an exploded schematic diagram of the overall structural components according to a preferred embodiment of the present invention.
Figure 2:
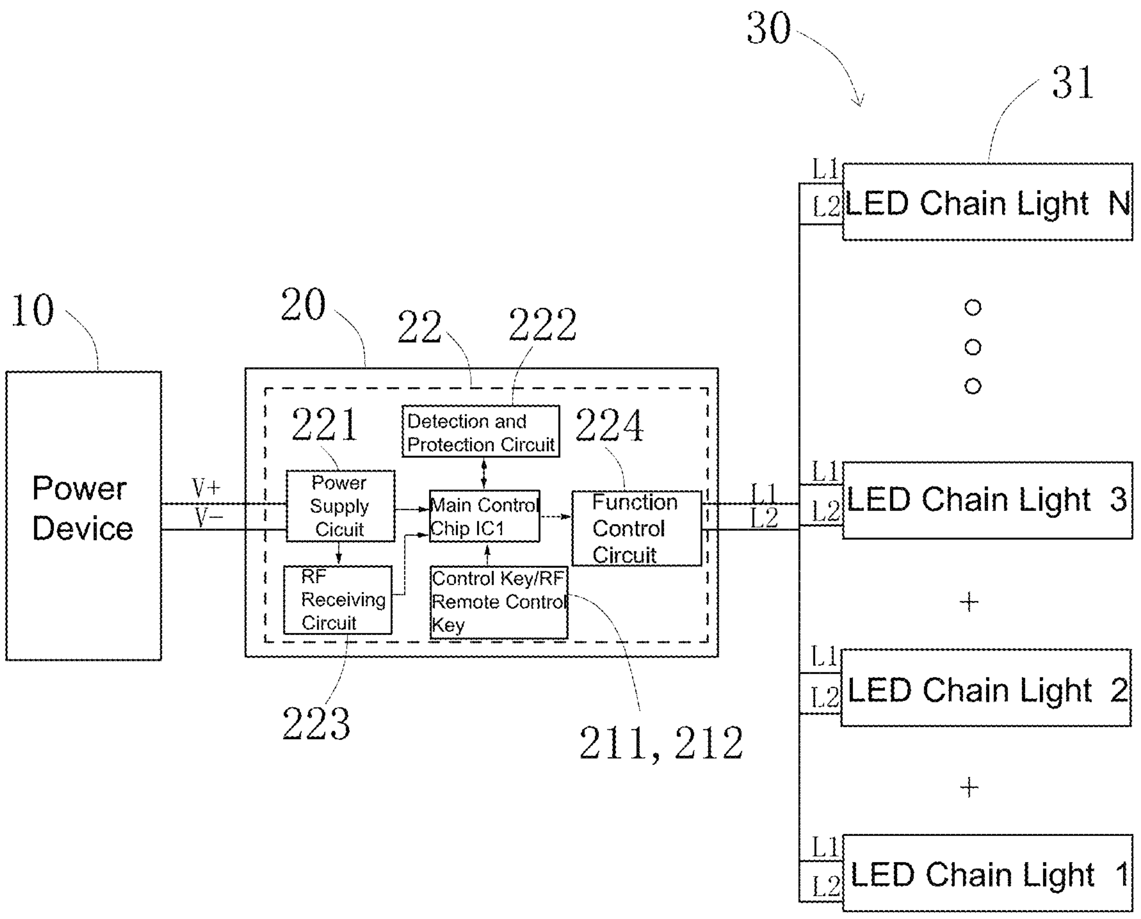
FIG. 2 is a system structural block diagram according to the preferred embodiment of the present invention.

Referring to FIG. 1 and FIG. 2 of the drawings, a lighting decoration control system for use on a Christmas tree according to preferred embodiment of the present invention is illustrated. The lighting decoration control system 100 comprises a power supply device 10, a control device 20 and an LED light string 30. The control device 20 is connected to the power supply device 10 and the LED light string 30 respectively. The power supply device 10 provides stable voltage and current to the control device 20, and the control device 20 provides function control such as on/off switch, flashing, color change, and time setting on the LED light string 30. The present invention will be further described in detail below with reference to the embodiments and drawings.

Referring to FIG. 1 of the drawings, the power supply device 10 comprises a first housing 11 having a rectangular housing structure; a power plug 111 and a first output terminal 112 provided at two ends of the first housing 11 along a length direction respectively; a circuit board 113 provided inside the first housing 11, and a power circuit 12 provided on the circuit board 113. The power circuit 12 comprises a first rectifier filter circuit 121, a power chip U1, a feedback circuit 122, a transformer T1 comprising a primary coil and a secondary coil, and a second rectifier filter circuit 123.

Figure 3:
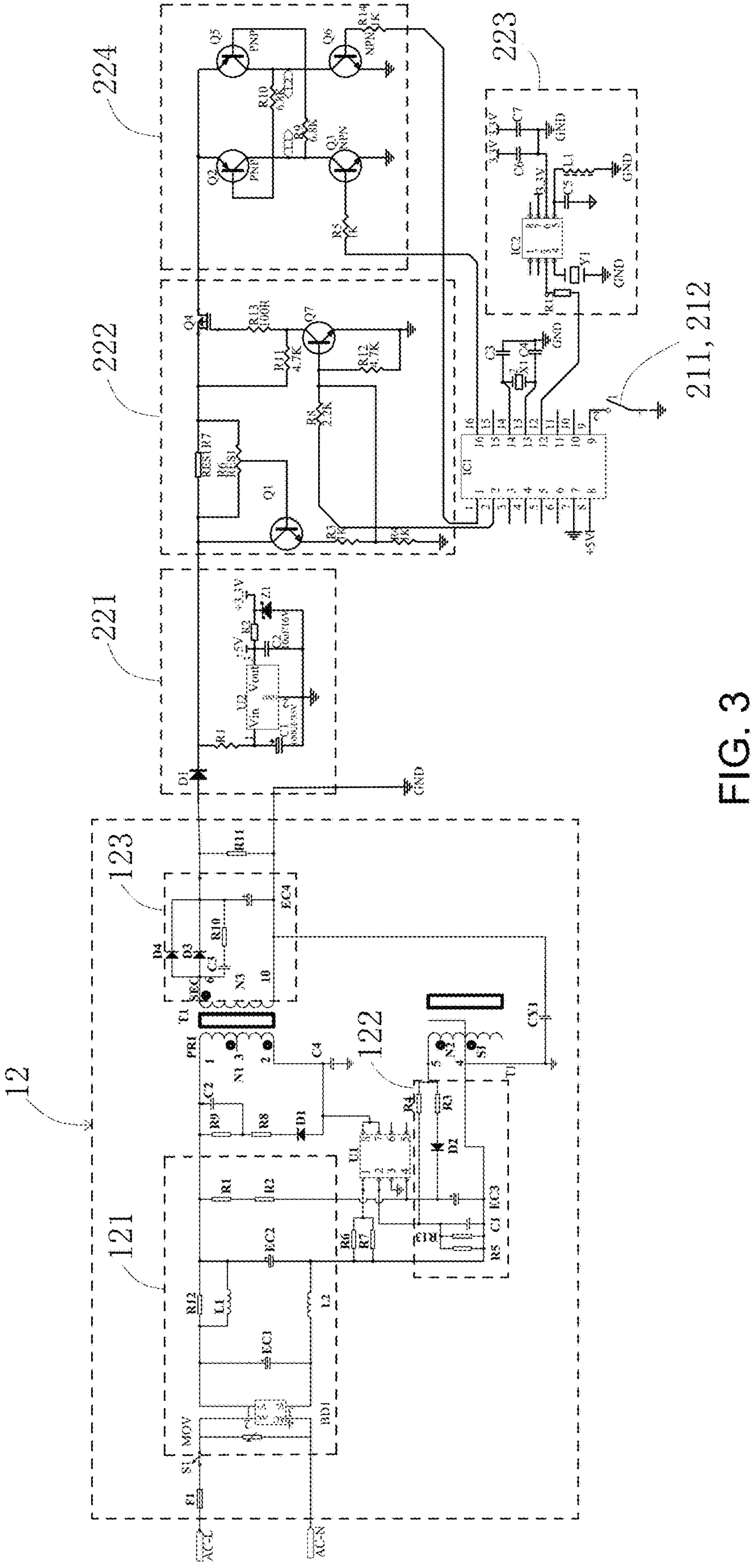
FIG. 3 is a schematic circuit diagram of the power circuit and control circuit according to the preferred embodiment of the present invention.

As shown in FIG. 3 of the drawings, the first rectifier filter circuit 121 is connected to a power input terminal. The first rectifier filter circuit 121 comprises a bridge stack BD1, capacitors EC1 and EC2, inductors L1 and L2 and resistors R1 and R2. The capacitors EC1, EC2, the inductors L1, L2 and the resistors R1, R2 forms a resonant circuit, which is connected in parallel to an output terminal of the bridge stack BD1. The 120V 60 HZ AC input from the external power supply is connected to the bridge stack BD1 through the fuse F1. The capacitor EC1 rectifies and filters the AC power to obtain smooth DC power. After the DC power is stepped down and filtered by resistors R1, R2 and capacitor EC3, it is connected to the power chip U1 through resistors R6 and R7 to supply power to the power chip U1.

Figure 7:
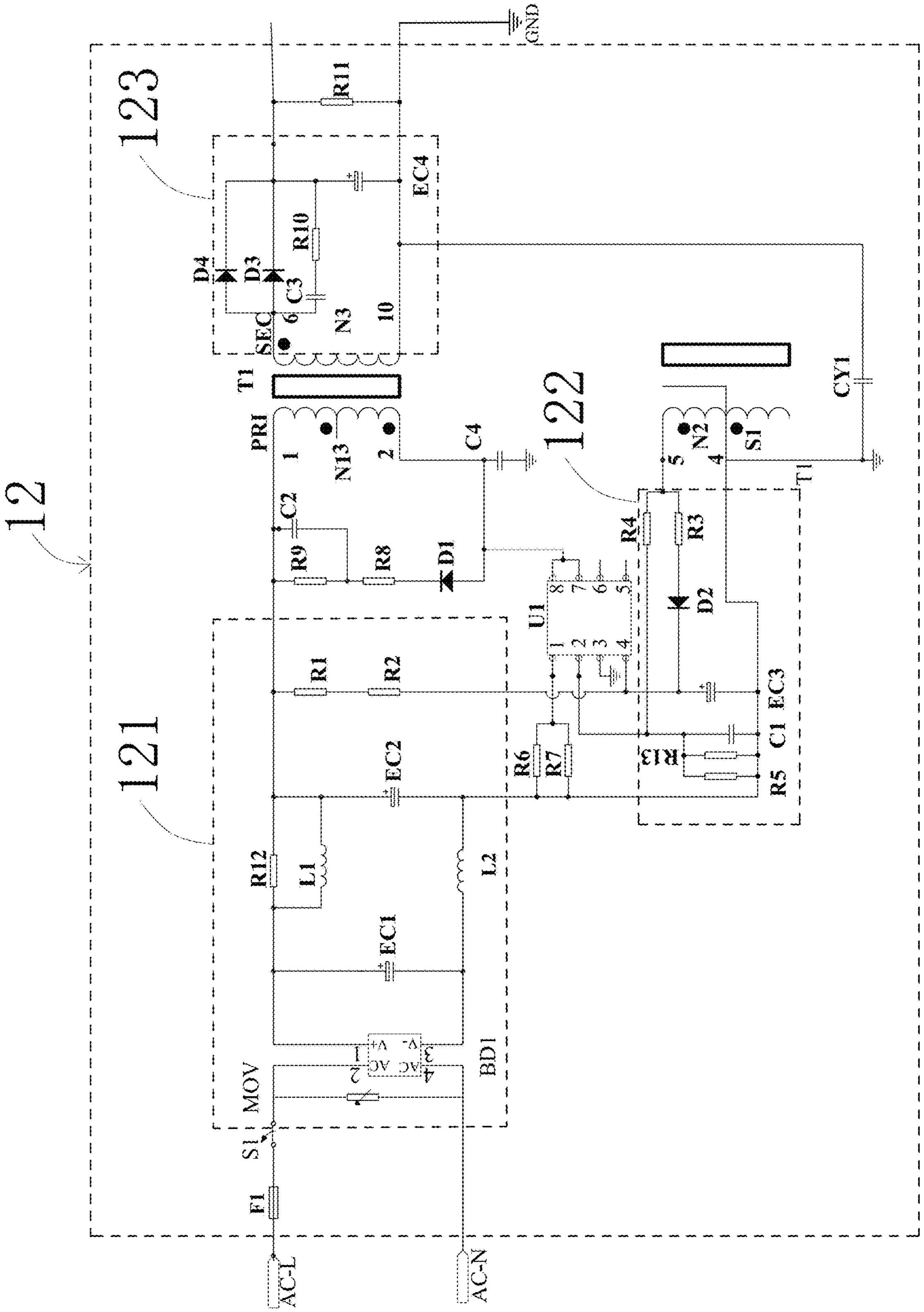
FIG. 7 is a partial enlarged view of FIG. 3 showing the schematic circuit diagram of the power circuit according to the preferred embodiment of the present invention.

As shown in FIG. 3 and FIG. 7 of the drawings, the feedback circuit 122 comprises resistors R5, R13, capacitors C1, EC3, resistors R3, R4 and diode D2. The resistors R5, R13, the capacitors C1 and EC3 are connected in parallel to the power chip U1. One end of the resistors R3, R4 and the diode D2 are connected in parallel with a primary coil of the transformer T1, and the other end of the resistors R3, R4 and the diode D2 are connected to power chip U1. The feedback circuit feeds back an output signal of the transformer T1 to the power chip U1. The primary coil of transformer T1 is connected to the power chip U1 through the resistor R9, the capacitor C2 and the resistors R1 and R2. the resistor R9, the capacitor C2 and the resistors R1 and R2 are connected in parallel with the resistor R8 and diode D1. The secondary coil of the transformer T1 is connected to the second rectifier filter circuit 123.

As shown in FIG. 3 and FIG. 7 of the drawings, the second rectifier filter circuit 123 comprises diodes D3, D4, capacitor C3, resistor R10 and capacitor EC4. The diodes D3, D4, the capacitor C3, and the resistor R10 are connected in parallel to the secondary coil of the transformer T1. The second rectifier filter circuit 123 is connected to an output end of the power circuit through the resistor R11, and is connected to the primary coil of the transformer T1 through the capacitor EC4 and the capacitor CY1. The power chip U1 is a chip with built-in overvoltage and overload protection programs, and is connected to the feedback circuit 122 and the primary coil of the transformer T1 respectively. The power chip U1 enables the power circuit 12 to control the transformer T1 to store energy when the power circuit 12 is under an on status, and the power circuit 12 controls the transformer T1 to discharge energy when the power circuit 12 is under an off status. By setting the turns ratio of transformer T1, a 29V DC can be obtained, thereby the design voltage for use by lower-level loads is obtained.

According to the preferred embodiment of the present invention, as shown in FIG. 1-FIG. 4 of the drawings, a control device 20 for controlling the operation of the power supply device 10 and the LED light string 30 is provided. The control device 20 comprises a second housing 21 having a rectangular housing structure, an oblate or an elliptical housing structure. The second housing 21 comprises a control key 211 on an upper side of the second housing 21, and may further comprise a radio frequency remote control key 212 for remote control operation. The control key 211 and the radio frequency remote control key 212 can also be arranged at the same time for selective use. The control key 211 and the radio frequency remote control key 212 can be a hand-operated press key and a radio frequency remote control operated key, or it can be a foot-operated press key and a radio frequency remote control operated key. The foot-operated press key and the radio frequency remote control operated key are integrated to a one-piece structure, and the two keys can be switched to one another by pedaling action. The user can switch to use the control key 211 or the radio frequency remote control key 212 as desired.

FIG. 1 shows three selectable embodiments of the control device 20 with the control key 211 and/or the radio frequency remote control key 212. From top to bottom, the control device 20 in the upper part provides the control key 211 or the radio frequency remote control key 212. The control device 20 in the middle part shows a second housing of rectangular housing structure, and provides the control key 211 or the radio frequency remote control key 212 which are foot-operated and are switchable to operate. The control device 20 in the bottom shows a second housing of oblate or elliptical housing structure, and provides the control key 211 or the radio frequency remote control key 212 which are foot-operated and are switchable to operate.

Figure 4:
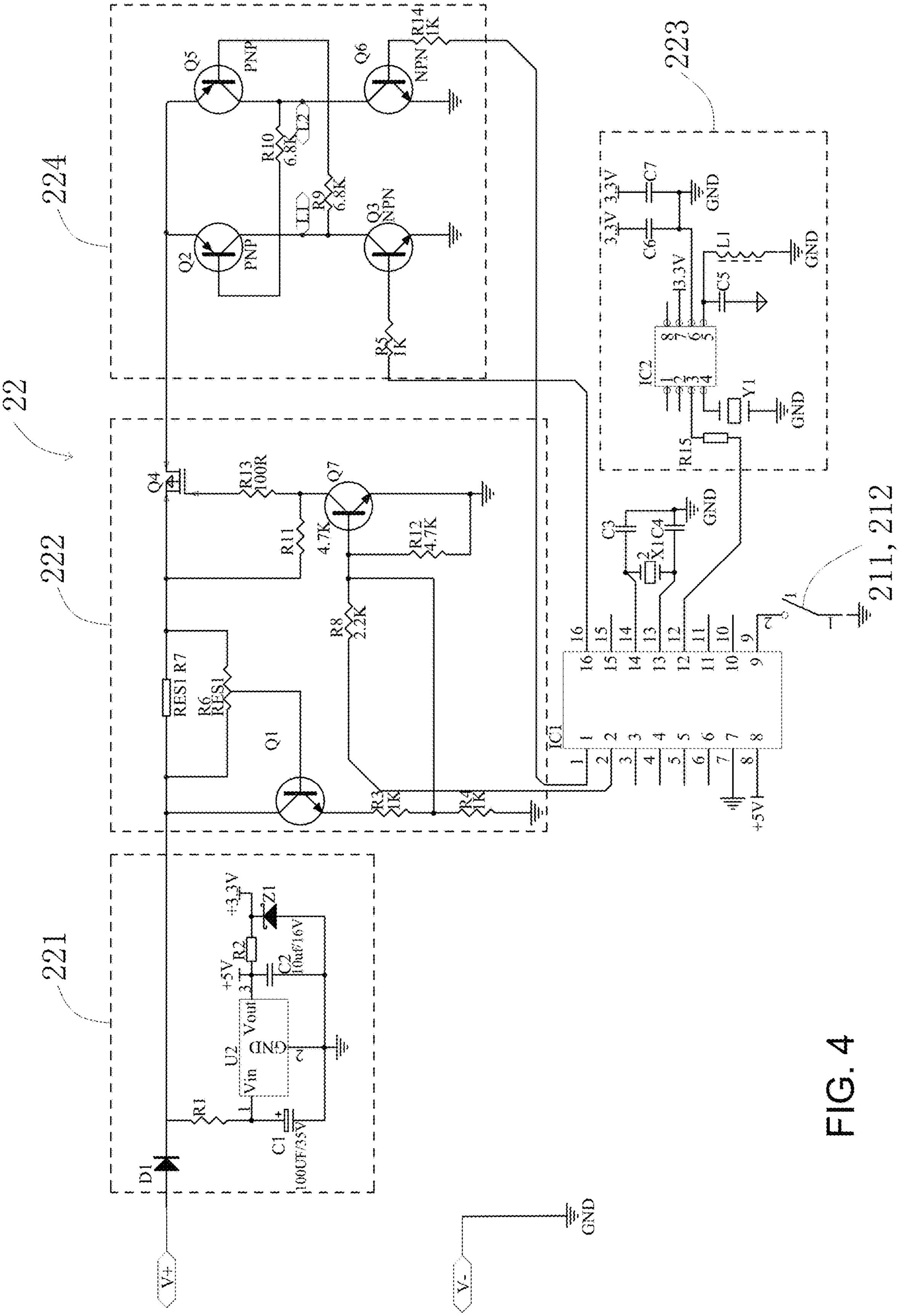
FIG. 4 is a schematic circuit diagram of the control circuit according to the preferred embodiment of the present invention.
Figure 5:
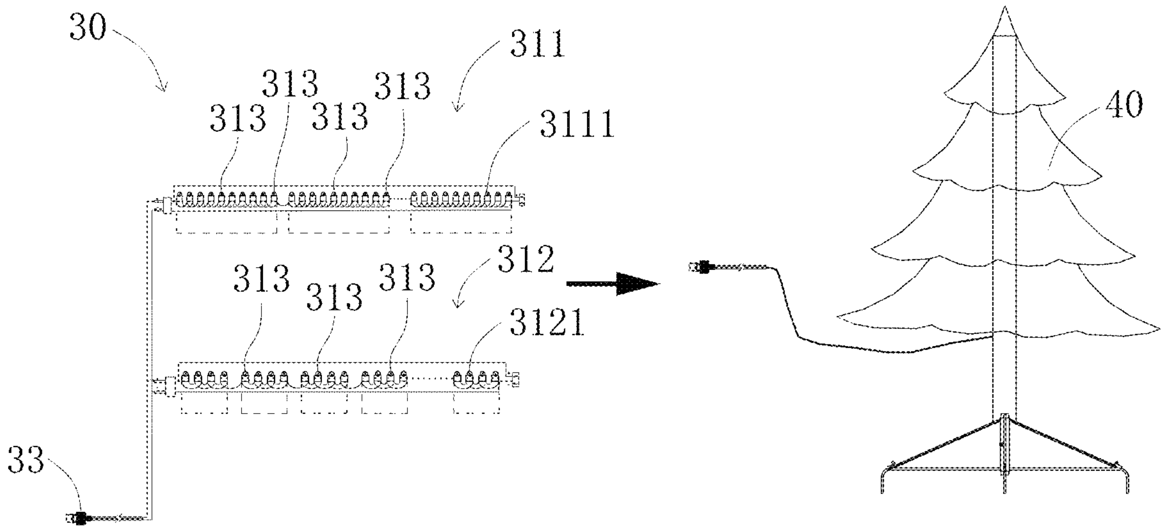
FIG. 5 is an exploded schematic view of the structural components of a light string according to the preferred embodiment of the present invention.
Figure 6A:
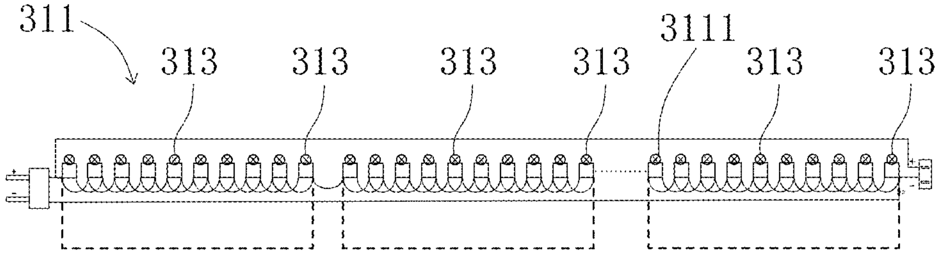
FIG. 6A is a schematic structural diagram of a poleless dual-color LED light string formed by parallel connection first and then series connection according to the preferred embodiment of the present invention.
Figure 6B:
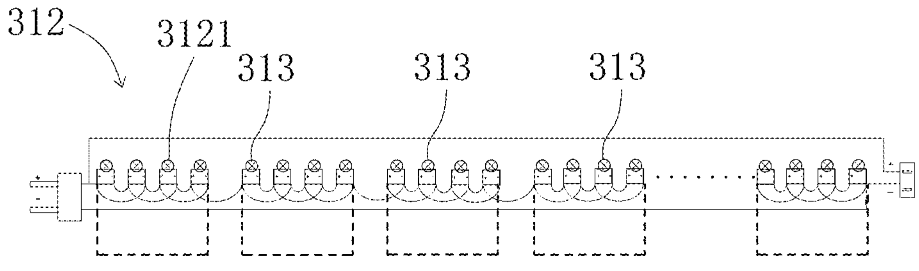
FIG. 6B a schematic structural diagram of a multi-group discrete poleless LED light string formed by first connecting in series and then connecting in parallel according to the preferred embodiment of the present invention.

The second housing 21 further comprises a plug-in input terminal 213 and a second output terminal 214. The input terminal 213 is plugged into the first output terminal 112 on the first housing 11. The second output terminal 214 is plugged into the wire terminal 33 connected to the LED light string 30. The second housing 21 further comprises a circuit board 210 inside the second housing 21, and the circuit board 210 has a control circuit 22 thereon. As shown in FIG. 4, the control circuit 22 comprises a power supply circuit 221, a detection and protection circuit 222, a main control chip IC1, a signal processing chip IC2, a radio frequency receiving circuit 223 and a function control circuit 224.

As shown in FIG. 4, the power supply circuit 221 comprises a power chip U2, a diode D1, resistors R1, R2, capacitors C1, C2 and a Zener diode Z1. The diode D1, resistor R1 and capacitor C1 are connected to the current input terminal of the power chip U2, the capacitor C2, the resistor R2 and the Zener diode Z1 are connected to the current output terminal of the power chip U2, and the Zener diode Z1 is connected to the radio frequency processing chip IC2. The power supply circuit 221 reduces the 29V DC power provided by the power supply circuit 12 to 3.3V DC power for use by the radio frequency processing chip IC2.

As shown in FIG. 4, the detection and protection circuit 222 comprises triodes Q1, Q4, Q7, resistors R3, R4, R6, R7, R11, R13 and a diode D1. The resistors R6, R7 and triode Q1 are connected in parallel between diode D1 and triode Q4. The resistors R3 and R4 are connected in series to triode Q1. Between the triode Q4 and the triode Q7, the resistor R13 and the resistor R11 are connected in parallel. The triode Q7 is connected to the main control chip IC1 through the resistor R8. The detection and protection circuit 222 is used for overload and short-circuit protection of the lighting decoration control system. The triodes Q1, Q4, Q7 and the resistors R6 and R7 constitute the short-circuit protection function of the circuit so that when the load is short-circuited, the triode Q1 is turned on, and the triodes Q4 and Q7 are cut off to protect each circuit.

As shown in FIG. 4, the main control chip IC1 is a chip that controls the entire lighting system and has a built-in systematic function control program. The main control chip IC1 is connected to the triodes Q1, Q3, Q6, Q7, the signal processing chip IC2, the control key 211 and the radio frequency remote control key 212 respectively. The low-voltage DC power reduces the 29V DC power to 5V through the diode D1, the resistor R1, the capacitor C1, the power chip U2, the capacitor C2 and the resistor R2, and 3.3V is provided to the main control chip IC1 and the radio frequency processing chip IC2. The main control chip IC1 controls the functions of the LED light string 30 such as switching, light flashing, color change, and time setting through the function control circuit 224. The radio frequency processing chip IC2 has a built-in radio frequency signal control program for processing radio frequency signals received by the radio frequency receiving circuit 223. The time setting refers to the flash and pause time setting of the LED light string.

As shown in FIG. 4, the radio frequency receiving circuit 223 comprises a signal processing chip IC2, a resistor R15, a crystal oscillator Y1, an inductor L1, and capacitors C5, C6, and C7. The resistor R15 is connected between the signal processing chip IC2 and the main control chip IC1. The crystal oscillator Y1 has one end connected to the signal processing chip IC2 and another end connected to the ground. The inductor L1 is connected to the signal processing chip IC2 through the capacitor C5. Capacitors C6 and C7 are connected in parallel to the signal processing chip IC2. The radio frequency receiving circuit 223 receives data sent by the remote-control device through the signal processing chip IC2. The main control chip IC1 processes the data received by the signal processing chip IC2 and then controls the function of the LED light string. The remote-control device refers to the control device 20 embodied in a second housing 21 with the control circuit 22.

As shown in FIG. 4, the function control circuit 224 comprises triodes Q2, Q3, Q5, and Q6. The triode Q3 is connected to the main control chip IC1 through the resistor R5. The triode Q6 is connected to the triode Q5 and the main control chip IC1 respectively. The triode Q2 is connected to the triodes Q3, Q5. The main control chip IC1 uses the function control circuit 224 to control the functions of switching, light flashing, color change and time setting of the LED light string 30.

Referring to FIG. 1, FIG. 5, FIG. 6A and FIG. 6B of the drawings, the control device 20 according to the preferred embodiment of the present invention is connected to the LED light string 30 through the second output terminal 214 and the wire terminal 33. The LED light string 30 is the carrier of the Christmas tree lighting decoration of the present invention. As shown in FIG. 2, the LED light string 30 is composed of multiple groups of LED light strings, such as LED light string 1, LED light string 2, LED light string 3 . . . and LED light string N. According to one embodiment of the present invention, the LED light string 30 is embodied as a plurality groups of LED light strings 31, each of the LED light strings 31 comprises a plurality of connecting poleless dual-color LED light strings 311. The poleless dual-color LED light string can change between two colors and has no positive and negative poles. In this embodiment, the plurality of poleless dual-color LED light strings 311 of the LED light string are formed by connecting multiple groups of poleless dual-color LED light beads 3111 in parallel to form one group of light strings, and then connecting the plurality of groups of light strings in series. In each group of poleless double-color LED light strings 311, two LED double-flash light beads 313 are connected in parallel. One LED double-flash light bead 313 is positioned between the two poleless dual-color LED light beads 3111 in the middle of the light string, and the other LED double-flash light bead 313 is positioned at the end of the group of poleless dual-color LED light strings 311. Each LED double-flash light bead 313 is provided with two flicker control chips respectively to control the switching between two different colors of LED double-flash light bead, and to control the parameters such as flashing time, interval and brightness of the LED double-flash light bead 313 such that users can choose their favorite lighting mode. To stabilize output current, the output end of the poleless dual-color LED light string 311 is electrically connected to the second output terminal 214 of the control device through a resistor or the output end of the poleless dual-color LED light string 311 can also be electrically connected to the control device through a constant current diode. In another embodiment, multiple groups of LED light strings 31 are connected by multiple groups of discrete poleless LED light strings 312. The discrete poleless LED light string 312 has no positive and negative poles and each individual light beads of the light string can be operated independently. In this embodiment, the multi-group discrete poleless LED light string 312 of the LED light string is composed of a plurality of discrete poleless LED light beads 3121 connected in series to form a set of light strings, and then the multiple sets of light strings are connected in parallel. There are two LED double-flash light beads 313 connected in series in each group of discrete poleless LED light strings 312. One LED double-flash light bead 313 is positioned between the two discrete poleless LED light beads 3121 in the middle of the light string, another LED double flashing light bead 313 is positioned at the end of the discrete poleless LED light string 312. Each LED double-flash light bead 313 is provided with two flicker control chips respectively to control the switching between two different colors of LED double-flash light bead, and to control the parameters such as flashing time, interval and brightness of the of LED double-flash light bead so that users can choose their favorite lighting mode. The output end of the discrete poleless LED light string 312 is electrically connected to the second output terminal 214 of the control device through a resistor or a constant current diode. The LED light string 30 is electrically connected to the second output terminal 214 of the control device 20 through the wire terminal 33. Multiple groups of poleless dual-color LED light strings 311 or multiple groups of discrete poleless LED light strings 312 are respectively arranged on different branches of the Christmas tree 40.

As shown in FIG. 1, when the Christmas tree lighting decoration control system of the present invention is used, the system is first started through the control key 211 or the radio frequency remote control key 212 of the control device 20. After the system is started, the on/off switch, light flashing, color change and time interval, etc. of the LED light string 30 can be controlled through the control device 20.

The present invention, while illustrated and described in terms of a preferred embodiment and several alternatives, is not limited to the particular description contained in this specification. Additional alternative or equivalent components could also be used to practice the present invention.

What is claimed is:

1. A lighting decoration control system for a Christmas tree, comprising a power supply device (10), a control device (20) and a LED light string (30), wherein said power supply device (10) comprises: a first housing (11) and a power circuit 12 received inside said first housing (11), said power circuit (12) having a power input terminal and a power output terminal comprises a first rectifier filter circuit (121) connected to said power input terminal, a power chip U1 connected to said first rectifier filter circuit (121), a feedback circuit (122) connected to said power chip U1, a transformer T1 comprising a primary coil connected to said power chip U1 and a secondary coil, and a second rectifier filter circuit (123) connected to said secondary coil of said transformer T1 and said power output terminal, wherein said first housing (11) comprises a power plug (111) connecting to said power input terminal and a first output (112) connected to said power output terminal;

said control device (20) comprises a second housing (21) and a control circuit (22) received inside said second housing (21), wherein said second housing (21) comprises a control key (211) or a radio frequency remote control key (212) provided thereon, a plug-in input terminal (213) and a plug-in second output terminal (214); said control circuit (22) comprises a power supply circuit (221), a detection and protection circuit (222) connected to said power supply circuit (221) as well as said control key (211) or said radio frequency remote control key (212) respectively, a main control chip IC1, a signal processing chip IC2, a radio frequency receiving circuit (223) and a function control circuit (224) connected to said detection and protection circuit (222) respectively, said main control chip IC1 is configured to process functional control on said LED light string (30) through the function control circuit (224), and the signal processing chip IC2 is configured to process data sent by the remote-control device received by said radio frequency receiving circuit (223), said LED light string (30) is composed of a plurality groups of poleless dual-color LED light strings (311) connected together, or a plurality groups of discrete poleless LED light strings (312) connected together, in each said group of poleless dual-color LED light strings (311) or discrete poleless LED light strings (312), at least one LED double-flash light bead (313) is provided, said LED light string (30) is electrically connected to said second output terminal (214) of said control device (20) through a connecting wire, and said control device (20) controls an on/off switching, a light flashing, a color change, and a time setting of said LED light string (30), said plurality groups of poleless dual-color LED light strings (311) or said plurality groups of discrete poleless LED light strings (312) are arranged to install on different branches of the Christmas tree (40) respectively.

2. The lighting decoration control system for a Christmas tree according to claim 1, wherein said first rectifier filter circuit (121) of said power circuit (12) comprises a bridge stack BD1, capacitors EC1 and EC2, inductors L1 and L2 and resistors R1 and R2, said capacitors EC1 and EC2, said inductors L1 and L2 and said resistors R1 and R2 are connected to an output terminal of said bridge stack BD1, said bridge stack BD1 and said capacitor EC1 rectifies and filters an AC power to obtain a smooth DC power, then the DC power is stepped down and filtered by the resistors R1, R2 and the capacitor EC3, and is transmitted through the resistors R6 and R7 to connect to said power chip U1 for power supply to said power chip U1; the feedback circuit (122) comprises resistors R5, R13, capacitors C1, EC3, resistors R3, R4 and a diode D2, said resistors R5, R13, said capacitors C1 and EC3 are connected in parallel to said power chip U1, said resistors R3, R4 and said diode D2 are connected to said transformer T1, said feedback circuit feeds back an output signal of said transformer T1 to said power chip U1; said transformer T1 comprises a primary coil and a secondary coil, said primary coil of said transformer T1 is connected to said power chip U1 through said resistor R9, said capacitor C2 and said resistors R1 and R2 while said resistor R9, said capacitor C2 and said resistors R1 and R2 are connected in parallel with said resistor R8 and said diode D1, said secondary coil of said transformer T1 is connected to said second rectifier filter circuit (123), which is constructed by diodes D3, D4, a capacitor C3, a resistor R10 and a capacitor EC4, said second rectifier filter circuit (123) is connected to an output end of said power circuit (12) through said resistor R11, and is connected to said primary coil of said transformer T1 through said capacitor CY1, said power chip U1 enables said power circuit (12) to control said transformer T1 to store energy when said power circuit (12) is under an on status, and to discharge energy when said power circuit (12) is under an off status.

3. The lighting decoration control system for a Christmas tree according to claim 1, wherein said first housing (11) has a rectangular housing structure defining a length direction, said power plug (111) and said first output terminal (112) are positioned at two opposite ends of said first housing (11) along said length direction; said second housing (21) has a rectangular housing structure or an oblate housing structure, said control key (211) or said (212) is a hand-operated press key and a radio frequency remote control operated key, or is a foot-operated press key and a radio frequency remote control operated key.

4. The lighting decoration control system for a Christmas tree according to claim 1, wherein said power supply circuit (221) of said control circuit (22) comprises a power chip U2, a diode D1, resistors R1, R2, capacitors C1, C2 and a Zener diode Z1, said diode D1, said resistor R1 and said capacitor C1 are connected to an input terminal of said power chip U2, said capacitor C2, said resistor R2 and said Zener diode Z1 are connected to an output terminal of said power chip U2, and said Zener diode Z1 is connected to said radio frequency processing chip IC2, said power supply circuit (221) reduces the 29V DC power provided by said power circuit (12) to 3.3V DC power for use by said radio frequency processing chip IC2.

5. The lighting decoration control system for a Christmas tree according to claim 1, wherein said detection and protection circuit (222) comprises triodes Q1, Q4, Q7, resistors R3, R4, R6, R7, R11, R13 and a diode D1, said resistors R3, R4, R6, R7 and diode D1 are connected to said triode Q1, said resistors R11 and R13 are connected in parallel and between the triode Q4 and Q7, said triode Q7 is connected to said main control chip IC1 through said resistor R8, said detection and protection circuit (222) performs overload and short-circuit protection so that when the load is short-circuited, said triode Q1 is turned on, and the triodes Q4 and Q7 are cut off to protect each circuit.

6. The lighting decoration control system for a Christmas tree according to claim 1, wherein said main control chip IC1 is connected to said triodes Q7, Q3, Q6, said signal processing chip IC2, said control key (211) and said radio frequency remote control key (212) respectively.

7. The lighting decoration control system for a Christmas tree according to claim 1, wherein said radio frequency receiving circuit (223) comprises a signal processing chip IC2, a resistor R15, a crystal oscillator Y1, an inductor L1, and capacitors C5, C6, and C7, said resistor R15 is connected between said signal processing chip IC2 and said main control chip IC1, said crystal oscillator Y1 has one end connected to said signal processing chip IC2 and another end connected to the ground, said radio frequency receiving circuit (223) receives data sent by the remote control through said signal processing chip IC2, said main control chip IC1 processes the data received by said signal processing chip IC2 and then controls the function of the LED light string.

8. The lighting decoration control system for a Christmas tree according to claim 1, wherein said function control circuit (224) comprises triodes Q2, Q3, Q5, and Q6, said triode Q3 is connected to said main control chip IC1 through said resistor R5, said triode Q6 is connected to said triode Q5 and said main control chip IC1 respectively, said main control chip IC1 process function control of on/off switching, light flashing, color change and time of the LED light string (30) through said function control circuit (224).

9. The lighting decoration control system for a Christmas tree according to claim 1, wherein said plurality group of poleless dual-color LED light strings (311) of the LED light string are formed by connecting a plurality of poleless dual-color LED light beads (3111) in parallel to form one group of light strings, and then connecting a plurality groups of light strings in series, wherein an output end of said poleless dual-color LED light strings (311) is electrically connected to said second output terminal (214) of said control device through a resistor or a constant current diode, said LED double-flash light bead (313) is connected in parallel between two said poleless dual-color LED lamp beads (3111) or at one end of each said group of poleless dual-color LED lamp strings (311), each said LED double-flash light bead (313) is built-in with two flicker control chips.

10. The lighting decoration control system for a Christmas tree according to claim 1, wherein said plurality group of discrete poleless LED light strings (312) of said LED light string are formed by connecting a plurality of discrete poleless LED light beads (3121) in series to form one group of light string, and then connecting a plurality groups of light strings in parallel, wherein an output end of said discrete poleless LED light string is electrically connected to said second output terminal (214) of said control device through a resistor or a constant current diode, said LED double-flash light bead (313) is connected in series between two said discrete poleless LED light beads (3121) or at one end of each said group of discrete poleless LED light strings (312), each said LED double-flash light bead (313) is built-in with two flicker control chips.

11. The lighting decoration control system for a Christmas tree according to claim 2, wherein said power supply circuit (221) of said control circuit (22) comprises a power chip U2, a diode D1, resistors R1, R2, capacitors C1, C2 and a Zener diode Z1, said diode D1, said resistor R1 and said capacitor C1 are connected to an input terminal of said power chip U2, said capacitor C2, said resistor R2 and said Zener diode Z1 are connected to an output terminal of said power chip U2, and said Zener diode Z1 is connected to said radio frequency processing chip IC2, said power supply circuit (221) reduces the 29V DC power provided by said power circuit (12) to 3.3V DC power for use by said radio frequency processing chip IC2.

12. The lighting decoration control system for a Christmas tree according to claim 11, wherein said detection and protection circuit (222) comprises triodes Q1, Q4, Q7, resistors R3, R4, R6, R7, R11, R13 and a diode D1, said resistors R3, R4, R6, R7 and diode D1 are connected to said triode Q1, said resistors R11 and R13 are connected in parallel and between the triode Q4 and Q7, said triode Q7 is connected to said main control chip IC1 through said resistor R8, said detection and protection circuit (222) performs overload and short-circuit protection so that when the load is short-circuited, said triode Q1 is turned on, and the triodes Q4 and Q7 are cut off to protect each circuit.

13. The lighting decoration control system for a Christmas tree according to claim 12, wherein said main control chip IC1 is connected to said triodes Q7, Q3, Q6, said signal processing chip IC2, said control key (211) and said radio frequency remote control key (212) respectively.

14. The lighting decoration control system for a Christmas tree according to claim 13, wherein said radio frequency receiving circuit (223) comprises a signal processing chip IC2, a resistor R15, a crystal oscillator Y1, an inductor L1, and capacitors C5, C6, and C7, said resistor R15 is connected between said signal processing chip IC2 and said main control chip IC1, said crystal oscillator Y1 has one end connected to said signal processing chip IC2 and another end connected to the ground, said radio frequency receiving circuit (223) receives data sent by the remote control through said signal processing chip IC2, said main control chip IC1 processes the data received by said signal processing chip IC2 and then controls the function of the LED light string.

15. The lighting decoration control system for a Christmas tree according to claim 14, wherein said function control circuit (224) comprises triodes Q2, Q3, Q5, and Q6, said triode Q3 is connected to said main control chip IC1 through said resistor R5, said triode Q6 is connected to said triode Q5 and said main control chip IC1 respectively, said main control chip IC1 process function control of on/off switching, light flashing, color change and time of the LED light string (30) through said function control circuit (224).

16. The lighting decoration control system for a Christmas tree according to claim 15, wherein said plurality group of poleless dual-color LED light strings (311) of the LED light string are formed by connecting a plurality of poleless dual-color LED light beads (3111) in parallel to form one group of light strings, and then connecting a plurality groups of light strings in series, wherein an output end of said poleless dual-color LED light strings (311) is electrically connected to said second output terminal (214) of said control device through a resistor or a constant current diode, said LED double-flash light bead (313) is connected in parallel between two said poleless dual-color LED lamp beads (3111) or at one end of each said group of poleless dual-color LED lamp strings (311), each said LED double-flash light bead (313) is built-in with two flicker control chips.

17. The lighting decoration control system for a Christmas tree according to claim 15, wherein said plurality group of discrete poleless LED light strings (312) of said LED light string are formed by connecting a plurality of discrete poleless LED light beads (3121) in series to form one group of light string, and then connecting a plurality groups of light strings in parallel, wherein an output end of said discrete poleless LED light string is electrically connected to said second output terminal (214) of said control device through a resistor or a constant current diode, said LED double-flash light bead (313) is connected in series between two said discrete poleless LED light beads (3121) or at one end of each said group of discrete poleless LED light strings (312), each said LED double-flash light bead (313) is built-in with two flicker control chips.

18. The lighting decoration control system for a Christmas tree according to claim 16, wherein said first housing (11) has a rectangular housing structure defining a length direction, said power plug (111) and said first output terminal (112) are positioned at two opposite ends of said first housing (11) along said length direction; said second housing (21) has a rectangular housing structure or an oblate housing structure, said control key (211) or said (212) is a hand-operated press key and a radio frequency remote control operated key, or is a foot-operated press key and a radio frequency remote control operated key.

19. The lighting decoration control system for a Christmas tree according to claim 17, wherein said first housing (11) has a rectangular housing structure defining a length direction, said power plug (111) and said first output terminal (112) are positioned at two opposite ends of said first housing (11) along said length direction; said second housing (21) has a rectangular housing structure or an oblate housing structure, said control key (211) or said (212) is a hand-operated press key and a radio frequency remote control operated key, or is a foot-operated press key and a radio frequency remote control operated key.

* * * * *